United States Patent
Lee et al.

(10) Patent No.: US 11,005,869 B2
(45) Date of Patent: May 11, 2021

(54) METHOD FOR ANALYZING CYBER THREAT INTELLIGENCE DATA AND APPARATUS THEREOF

(71) Applicant: KOREA INTERNET & SECURITY AGENCY, Naju-si (KR)

(72) Inventors: Seul Gi Lee, Naju-si (KR); Nak Hyun Kim, Naju-si (KR); Hyei Sun Cho, Naju-si (KR); Byung Ik Kim, Naju-si (KR); Jun Hyung Park, Naju-si (KR)

(73) Assignee: KOREA INTERNET & SECURITY AGENCY, Naju-si (KR)

( * ) Notice: Subject to any disclaimer, the term of this patent is extended or adjusted under 35 U.S.C. 154(b) by 254 days.

(21) Appl. No.: 16/173,856

(22) Filed: Oct. 29, 2018

(65) Prior Publication Data

US 2019/0166142 A1 May 30, 2019

(30) Foreign Application Priority Data

Nov. 24, 2017 (KR) .................... 10-2017-0157950
Aug. 1, 2018 (KR) .................... 10-2018-0089698

(51) Int. Cl.
*H04L 29/06* (2006.01)
*G06F 21/57* (2013.01)
(Continued)

(52) U.S. Cl.
CPC ........ *H04L 63/1425* (2013.01); *G06F 16/285* (2019.01); *G06F 16/9024* (2019.01);
(Continued)

(58) Field of Classification Search
CPC ............... H04L 63/1425; G06F 16/285; G06F 16/9024; G06F 21/552; G06F 21/577
(Continued)

(56) References Cited

U.S. PATENT DOCUMENTS

| | | | |
|---|---|---|---|
| 10,652,260 B1* | 5/2020 | Rodriguez | .......... H04L 63/1416 |
| 2017/0251016 A1* | 8/2017 | Niv | .......................... H04L 43/08 |
| 2019/0089720 A1* | 3/2019 | Aditham | ............... H04L 9/3239 |

FOREIGN PATENT DOCUMENTS

| | | |
|---|---|---|
| KR | 20100067387 A | 6/2010 |
| KR | 20160089800 A | 7/2016 |

(Continued)

OTHER PUBLICATIONS

Korean Intellectual Property Office, Notice of Allowance for Korean Patent Application No. 10-2017-0157950 dated Jul. 17, 2018.
(Continued)

*Primary Examiner* — Jacob Lipman
(74) *Attorney, Agent, or Firm* — SoCal IP Law Group LLP; Jonathan Pearce

(57) ABSTRACT

A method and apparatus for analyzing cyber threat intelligence data. The method includes: acquiring first and second CTI graphs including first and second CTI data, respectively, classified based on a first classification item; classifying the first CTI data and the second CTI data based on a second classification item determined depending on the first classification item; outputting a graph similarity of the first and second CTI graphs determined based on a first CTI similarity between the first and second CTI data when the first and second CTI data belong to the same classification as a result of the classification; setting the first CTI graph and the second CTI graph to be included in one group when the graph similarity is equal to or greater than a threshold value; and outputting CTI information including the first and second CTI data for each group.

13 Claims, 10 Drawing Sheets

(51) Int. Cl.
*G06F 16/28* (2019.01)
*G06F 16/901* (2019.01)
*G06F 21/55* (2013.01)

(52) U.S. Cl.
CPC .......... *G06F 21/552* (2013.01); *G06F 21/577* (2013.01); *G06F 2221/034* (2013.01)

(58) Field of Classification Search
USPC ........................................................ 726/25
See application file for complete search history.

(56) References Cited

FOREIGN PATENT DOCUMENTS

| KR | 101733000 A | 5/2017 |
|---|---|---|
| KR | 20170086898 A | 7/2017 |
| KR | 101780933 B1 | 9/2017 |

OTHER PUBLICATIONS

Korean Intellectual Property Office, First Office Action for Korean Patent Application No. 10-2017-0157950 dated Apr. 4, 2018.

\* cited by examiner

| Comparative group | First classification item | CTI data value |
|---|---|---|
| First CTI data | ip | 201.\*.\*.19 |
| | domain | spo\*\*\*kac.com |
| | domain | spo\*\*\*hkrr.com |
| | domain | spo\*\*\*hkrf.com |
| | attack_type | RIG |
| | malware | hxxp://www.g\*\*\*\*\*e.co.kr/castlephp/java.exe |
| | malware | java-test-11-001_a2c210d23c9a106.exe |
| | malware | php3.php.exe |
| | vulnerability | CVE-2013-0422 |
| | vulnerability | hxxp://spo\*\*\*kac.com/img/front-page/11-001.gif |

520

| Comparative group | First classification item | CTI data value |
|---|---|---|
| Second CTI data | ip | 137.\*.\*.201 |
| | domain | sp\*\*\*ok.com |
| | domain | sp\*\*\*hkrp.com |
| | domain | sp\*\*\*hkre.com |
| | attack_type | RIG-v |
| | malware | hxxp://www.g\*\*\*\*\*e.co.kr/castlephp11001/java.exe |
| | malware | java-test-11-001_a2c210d23c9a106.exe |
| | vulnerability | hxxp://spo\*\*\*ok.com/img/front-page/11-002.gif |
| | file | 11-001-labeled 186 |

FIG. 6

| First classification item | Second classification item | Similarity calculation method |
|---|---|---|
| IP | IP | - Checking the same range when IP address reassignment information exists |
| | | - Checking the same range up to C-class band when reassignment information does not exist |
| Domain | Subdomain | - Included as similarity calculation target when length of subdomain is equal to or greater than threshold value |
| | Domainstring | |
| | SLD | |
| | TLD | |
| attack_type | attack_type | - Calculating similarity using editdistance (attack type) |
| URL type malware | Subdomain | - Excluded from similarity calculation target |
| | Domainstring | |
| | SLD | |
| | TLD | |
| | path | |
| | filename | |
| Filename type malware | filename | - Calculating similarity using editdistance (filename) |
| URL type vulnerability | Subdomain | - Included as similarity calculation target when length of subdomain is equal to or greater than threshold value |
| | Domainstring | |
| | SLD | |
| | TLD | |
| | path | |
| | filename | |
| CVE type vulnerability | CVE | - Excluded from similarity calculation target |
| File | filename | - Calculating similarity using editdistance (filename) |
| | hash | - Excluded from similarity calculation target |

FIG. 7

| Comparative group | First classification item | Primarily classified CTI data value | Second classificatin item | Secondarily classified CTI data value |
|---|---|---|---|---|
| First CTI data | ip | 201.*.*.19 | ip | 201.*.*.19 |
| | domain | spo*kac.com | domainstring | spo*kac |
| | domain | spo*hkrr.com | domainstring | spo*hkrr |
| | domain | spo*hkrf.com | domainstring | spo*hkrf |
| | attack_type | RIG | attack_type | RIG |
| | malware | hxxp://www.g***e.co.kr/castlephp/java.exe | domainstring | g***e |
| | | | path | castlephp/ |
| | | | filename | java.exe |
| | malware | java-test-11-001_a2c210d23c9a106.exe | filename | java-test-11-001_a2c210d23c9a106.exe |
| | malware | php3.php.exe | filename | php3.php.exe |
| | vulnerability | CVE-2013-0422 | - | - |
| | vulnerability | hxxp://spo*kac.com/img/front-page/11-001.gif | domainstring | spo*kac |
| | | | path | img/front-page/ |
| | | | filename | 11-001.gif |
| Second CTI data | ip | 137.*.*.201 | ip | 137.*.*.201 |
| | domain | sp*ok.com | domainstring | sp*ok |
| | domain | sp*hkrp.com | domainstring | sp*hkrp |
| | domain | sp*hkre.com | domainstring | sp*hkre |
| | attack_type | RIG-v | attack_type | RIG-v |
| | malware | hxxp://www.g***e.co.kr/castlephp11001/java.exe | domainstring | g***e |
| | | | path | castlephp11001/ |
| | | | filename | java.exe |
| | malware | java-test-11-001_a2c210d23c9a106.exe | filename | java-test-11-001_a2c210d23c9a106.exe |
| | vulnerability | hxxp://spo*ok.com/img/front-page/11-002.gif | domainstring | spo*ok.com |
| | | | path | img/front-page |
| | | | filename | 11-002.gif |
| | file | 11-001- labeled 186 | filename | 11-001- labeled 186 |

FIG. 8

| Second classification item | Secondarily classified first CTI data | Secondarily classified second CTI data |
|---|---|---|
| IP | 201.*.*.19 | 137.*.*.201 |
| Domainstring | spo*kac | sp*ok |
| | spo*hkrr | sp*hkrp |
| | spo*hkrf | sp*hkre |
| | - | g*****e |
| | - | spo***ok |
| Attack_Type | RIG | RIG-v |
| Path | castlephp/ | castlephp11001/ |
| | img/front-page/ | img/front-page |
| Filename | java.exe | java.exe |
| | java-test-11-001_a2c210d23c9a106.exe | java-test-11-001_a2c210d23c9a106.exe |
| | php3.php.exe | 11-002.gif |
| | 11-001.gif | 11-001-labeled 186 |

FIG. 9

| Second classification item | Secondarily classified first CTI data | Secondarily classified second CTI data |
|---|---|---|
| Domainstring | spo*kac | sp*ok |
| | | sp***hkrp |
| | | sp***hkre |
| | | g*****e |
| | | spo***ok |
| | spo*hkrr | sp*ok |
| | | sp***hkrp |
| | | sp***hkre |
| | | g*****e |
| | | spo***ok |
| | spo*hkrf | sp*ok |
| | | sp***hkrp |
| | | sp***hkre |
| | | g*****e |
| | | spo***ok |

METHOD FOR ANALYZING CYBER THREAT INTELLIGENCE DATA AND APPARATUS THEREOF

This application claims priority Korean Patent Application No. 10-2017-0157950, filed on Nov. 24, 2017 in the Korean Intellectual Property Office and Korean Patent Application No. 10-2018-0089698, filed on Aug. 1, 2018 in the Korean Intellectual Property Office, the disclosure of which is incorporated herein by reference in its entirety.

BACKGROUND

1. Field of the Disclosure

The present disclosure relates to a method and apparatus for analyzing cyber threat intelligence data. More particularly, the present disclosure relates to a method and apparatus for facilitating data access by analyzing cyber threat intelligence data built in a graph database.

2. Description of the Related Art

As infringement accidents rapidly increase in computing systems, information related to infringement accidents is shared through open source intelligence (OSINT). Moreover, various methods have been attempted to protect attacks against infringing resources in advance by refining and managing information on shared infringement accidents by intelligence information, that is, cyber threat intelligence (CTI). Infringing resources refer to resources used for security infringements.

For example, information about infringement accidents is being built into a graph database of infringing resources. The graph database refers to a data base in which data is stored in the form of a graph, thereby generalizing a structure and increasing accessibility. The graph data of infringing resources is configured to store infringing resources and properties of the infringing resources in vertices and record the relationship of attribute values of an edge connecting a vertex and another vertex. The vertex constitutes a node of the graph.

Since the graph data about various infringing resources collected through a network is composed of only vertices and edges, its overall structure is very simple, and thus it is easy to establish a strategy for preventing attacks by infringing resources in advance. However, generally, the number of collected infringing resources is very large, and numerous vertices may be included in the graph database. When the number of vertices is excessively large, there is a problem that access to desired data becomes difficult.

Accordingly, the database on infringing resources needs to be configured so as to facilitate access to desired data by making the structure as simple as possible by grouping various pieces of information into a common denominator. Further, as new infringing resources occur occasionally, data on new infringing resources are collected occasionally, and thus there is a need to facilitate the updating of new infringing resources.

SUMMARY

An aspect of the present disclosure is to provide a method and apparatus for analyzing CTI data, in which a database easier to use can be provided by grouping and managing CTI data including information about infringing resources.

Another aspect of the present disclosure is to provide a method and apparatus for analyzing CTI data, in which more useful CIT data can be provided by determining similarity between groups of CTI data.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a method of analyzing cyber threat intelligence data using a computing device, comprising, acquiring a first CTI graph including a first vertex composed of first CTI data classified based on a first classification item and a second CTI graph including a second vertex composed of second CTI data classified based on the first classification item, classifying the first CTI data and the second CTI data based on a second classification item determined depending on the first classification item, outputting a graph similarity of the first CTI graph and the second CTI graph determined based on a first CTI similarity between the first CTI data and the second CTI data when the first CTI data and the second CTI data belong to the same classification as a result of the classification, setting the first CTI graph and the second CTI graph to be included in one group when the graph similarity is equal to or greater than a threshold value and outputting CTI information including the first CTI data and the second CTI data for each group.

According to another aspect of the present disclosure, there is provided a cyber threat intelligence data analyzing apparatus, comprising, a processor and a memory storing one or more instructions executed by the processor, wherein the one or more instructions includes, acquiring a first CTI graph including a first vertex composed of first CTI data classified based on a first classification item and a second CTI graph including a second vertex composed of second CTI data classified based on the first classification item, classifying the first CTI data and the second CTI data based on a second classification item determined depending on the first classification item, outputting a graph similarity of the first CTI graph and the second CTI graph determined based on a first CTI similarity between the first CTI data and the second CTI data when the first CTI data and the second CTI data belong to the same classification as a result of the classification, setting the first CTI graph and the second CTI graph to be included in one group when the graph similarity is equal to or greater than a threshold value and outputting CTI information including the first CTI data and the second CTI data for each group.

According to other aspect of the present disclosure, there is provided a computer program, which is stored in a non-transitory computer-readable medium, and commands of which are executed by a processor of a cyber threat intelligence data analyzing apparatus, the computer program performing, acquiring a first CTI graph including a first vertex composed of first CTI data classified based on a first classification item and a second CTI graph including a second vertex composed of second CTI data classified based on the first classification item, classifying the first CTI data and the second CTI data based on a second classification item determined depending on the first classification item, outputting a graph similarity of the first CTI graph and the second CTI graph determined based on a first CTI similarity between the first CTI data and the second CTI data when the first CTI data and the second CTI data belong to the same classification as a result of the classification, setting the first CTI graph and the second CTI graph to be included in one group when the graph similarity is equal to or greater than a threshold value and outputting CTI information including the first CTI data and the second CTI data for each group.

According to other aspect of the present disclosure, there is provided a cyber threat intelligence analysis system, comprising, a threat information storage/management platform recording first CTI data collected through a first channel in a first vertex of a first CTI graph and recording second data through a second channel in a second vertex of a second CTI graph, a database storing the first CTI graph and the second CTI graph, a threat information classification module classifying the first CTI data and the second CTI data based on a first classification item and a cyber threat intelligence data analyzing apparatus classifying the first CTI data and the second CTI data based on a second classification item determined depending on the first classification item, outputting a graph similarity of the first CTI graph and the second CTI graph determined based on a first CTI similarity between the first CTI data and the second CTI data when the first CTI data and the second CTI data belong to the same classification as a result of the classification, setting the first CTI graph and the second CTI graph to be included in one group when the graph similarity is equal to or greater than a threshold value, and outputting CTI information including the first CTI data and the second CTI data for each group.

BRIEF DESCRIPTION OF THE DRAWINGS

The above and other aspects and features of the present disclosure will become more apparent by describing in detail exemplary embodiments thereof with reference to the attached drawings, in which:

FIG. 5 is a view illustrating an example of CTI data classified based on first classification items;

FIG. 6 is a view illustrating an example of relationship between first classification items and second classification items according to an embodiment;

FIG. 7 is a view illustrating an example in which CTI data classified based on first classification items are classified based on second classification items according to an embodiment;

FIG. 8 is a view illustrating an example of CTI data classified based on second classification items according to an embodiment;

FIG. 9 is a view illustrating an example of a list of operations that yield a CTI similarity performed to calculate a graph similarity from CTI data classified based on second classification items according to an embodiment.

DETAILED DESCRIPTION OF THE EMBODIMENTS

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

It will be understood that the terms "comprise" and/or "comprising" when used herein, specify some stated components, steps, operations and/or elements, but do not preclude the presence or addition of one or more other components, steps, operations and/or elements.

As used herein, an infringement accident refers to a case where a malicious action is performed on assets constituting an information processing system. Further, infringing resources refer to information related infringement accidents, such as malicious actors, infrastructures for performing malicious acts, and malicious tools. For example, infringing resources may include information about IP, domain, attack type, attack path, vulnerability, and malware, which are used in infringement accidents.

As used herein, cyber threat intelligence (CTI) data refers to data including information about infringing resources. Further, a CTI graph refers to a set of CTI data stored in a graph database.

As used herein, a CTI similarity refers to a similarity between CTI data and another CTI data. Further, a graph similarity refers to degree of similarity between a CTI graph and another CTI graph.

Hereinafter, embodiments of the present disclosure will be described with reference to the attached drawings.

Figure 1:
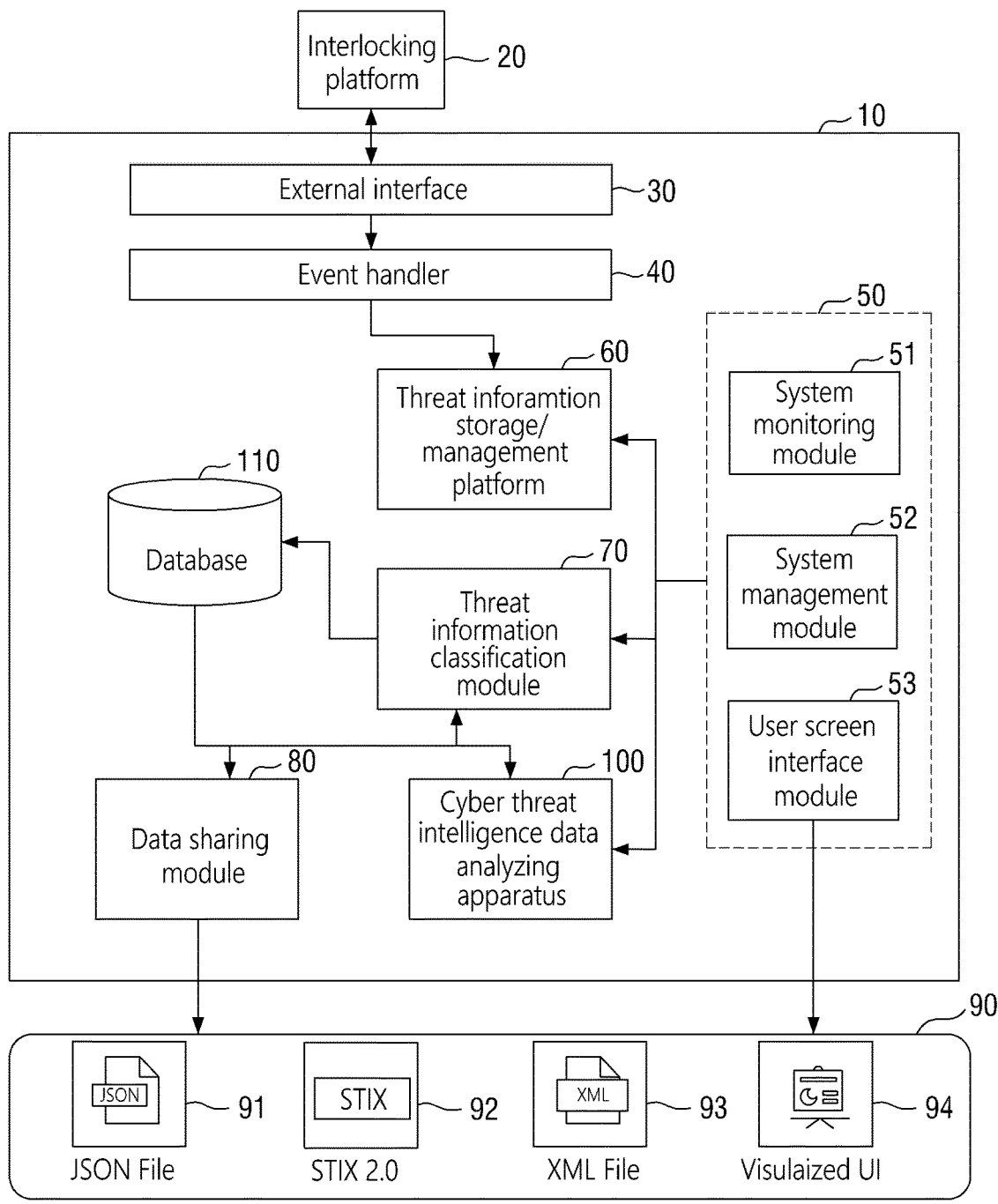
FIG. 1 is a diagram illustrating a cyber threat information analysis and sharing (CTIAS) system according to an embodiment.

FIG. 1 is a diagram illustrating a cyber threat information analysis and sharing system 10 according to an embodiment. However, FIG. 1 is only for explaining an embodiment, and the configuration shown in FIG. 1 may be modified so as to perform the same function according to an embodiment.

The cyber threat information analysis and sharing system 10 may store and manage CTI data collected from the outside. Further, the cyber threat information analysis and sharing system 10 may output the stored CTI data to the outside. For example, the cyber threat information analysis and sharing system 10 may provide CTI data in the form of a file of a sharable format file such as a javascript object notation (JSON) file 91, a structured threat information expression (STIX) file 92, or an extensible markup language (XML) file 93. As another example, the cyber threat information analysis and sharing system 10 may output CTI data through a visualized user interface (UI) 94.

The cyber threat information analysis and sharing system 10 may include an external interface 30 for performing data transmission and reception with an interlocking platform 20. The cyber threat information analysis and sharing system 10 may collect CTI data through the interlocking platform 20.

According to an embodiment, the cyber threat information analysis and sharing system 10 may include a threat information storage/management platform 60, a threat information classification module 70, a system operation unit 50, a cyber threat intelligence data analyzing apparatus 100, a data sharing module 80, and a database 110. The threat information storage/management platform 60 may store CTI data collected from the outside through an event handler 40 in the database 110 in the form of a graph database, and may manage the stored CTI data. Further, the threat information storage/management platform 60 may classify and store the CTI data for each channel in which the CTI data is collected. That is, the threat information storage/management platform 60 may store CTI data in the database 110 such that CTI data received from one channel is included in one graph. For example, first CTI data collected through a first channel may be recorded at a first vertex of a first CTI graph, and second CTI data collected through a second channel may be recorded at a second vertex of a second CTI graph. When the threat information storage/management platform 60 stores the collected CTI data, the threat information classification module 70 may allow the CTI data to be stored in the database 110 in a state that the CTI data is classified based on first classification items.

The cyber threat intelligence data analyzing apparatus 100 may analyze the CTI data stored in the database 110. According to an embodiment, the cyber threat intelligence data analyzing apparatus 100 may determine second classification items according to the first classification items to which the CTI data stored in the database 110 belongs. The cyber threat intelligence data analyzing apparatus 100 may classify the CTI data again according to the determined second classification items. The cyber threat intelligence data analyzing apparatus 100 according to an embodiment may classify the CTI data into the second classification items determined according to the first classification items in more detail, thereby increasing the reliability of similarity determination results while excluding unnecessary operations. According to an embodiment, the cyber threat intelligence data analyzing apparatus 100 may set the group for the CTI graph stored in the database 110 based on the similarity determination results. That is, the group for each CTI graph may be set such that CTI graphs determined to be similar to each other belong to the same group.

The system operation unit 50 of the cyber threat information analysis and sharing system 10 may manage the operation of each component of the cyber threat information analysis and sharing system 10. The system operation unit 50 may include a system monitoring module 51 for monitoring the operation of the system, a system management module 52 managing the function of the system, and a user screen interface module 53 for generating and outputting a visualized user interface.

The data sharing module 80 may output the output data 90 including the CTI data stored in the database 110 according to an output mode.

Figure 2:
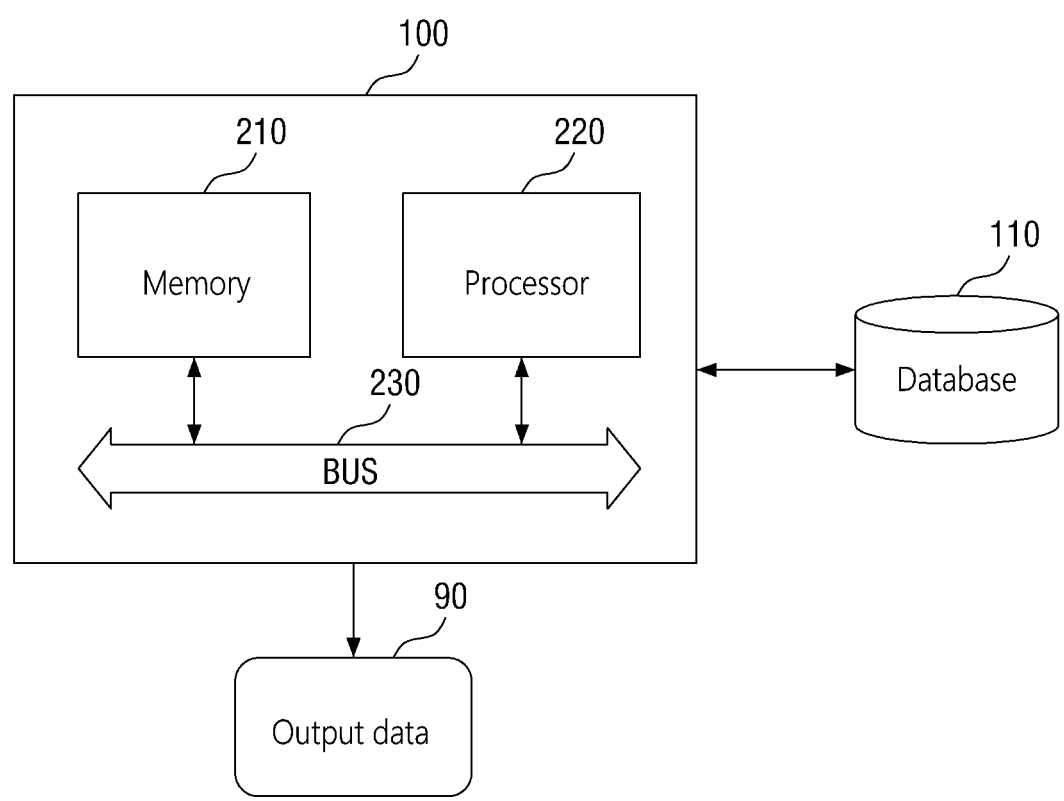
FIG. 2 is a diagram illustrating a structure of a cyber threat intelligence data analyzing apparatus according to an embodiment.

FIG. 2 is a diagram illustrating a structure of a cyber threat intelligence data analyzing apparatus according to an embodiment.

The cyber threat intelligence data analyzing apparatus 100 may be a computing device including a memory 210 and a processor 220. The memory 210 may load one or more instructions included in a storage medium. The processor 220 may control the operation of the cyber threat intelligence data analyzing apparatus 100 according to an embodiment by executing one or more instructions stored in the memory 210. Here, one or more instructions may allow the cyber threat intelligence data analyzing apparatus 100 to perform a process of analyzing CTI data. The respective components of the cyber threat intelligence data analyzing apparatus 100 may transmit or receive data to or from each other through a system bus 230.

According to an embodiment, the processor 220 of the cyber threat intelligence analyzing apparatus 100 may acquire a graph similarity between the CTI graphs by executing the process of analyzing the CTI data stored in the database 110, and may output the output data 90 generated based on the graph similarity. The cyber threat intelligence data analyzing apparatus 100 may output the output data 90, so that the output data 90 may be reflected in the database 110 or may be output to the outside.

In FIG. 2, the database 110 is shown separately from the cyber threat intelligence data analyzing apparatus 100. However, according to another embodiment, the cyber threat intelligence data analyzing apparatus 100 may include the database 110.

Figure 3:
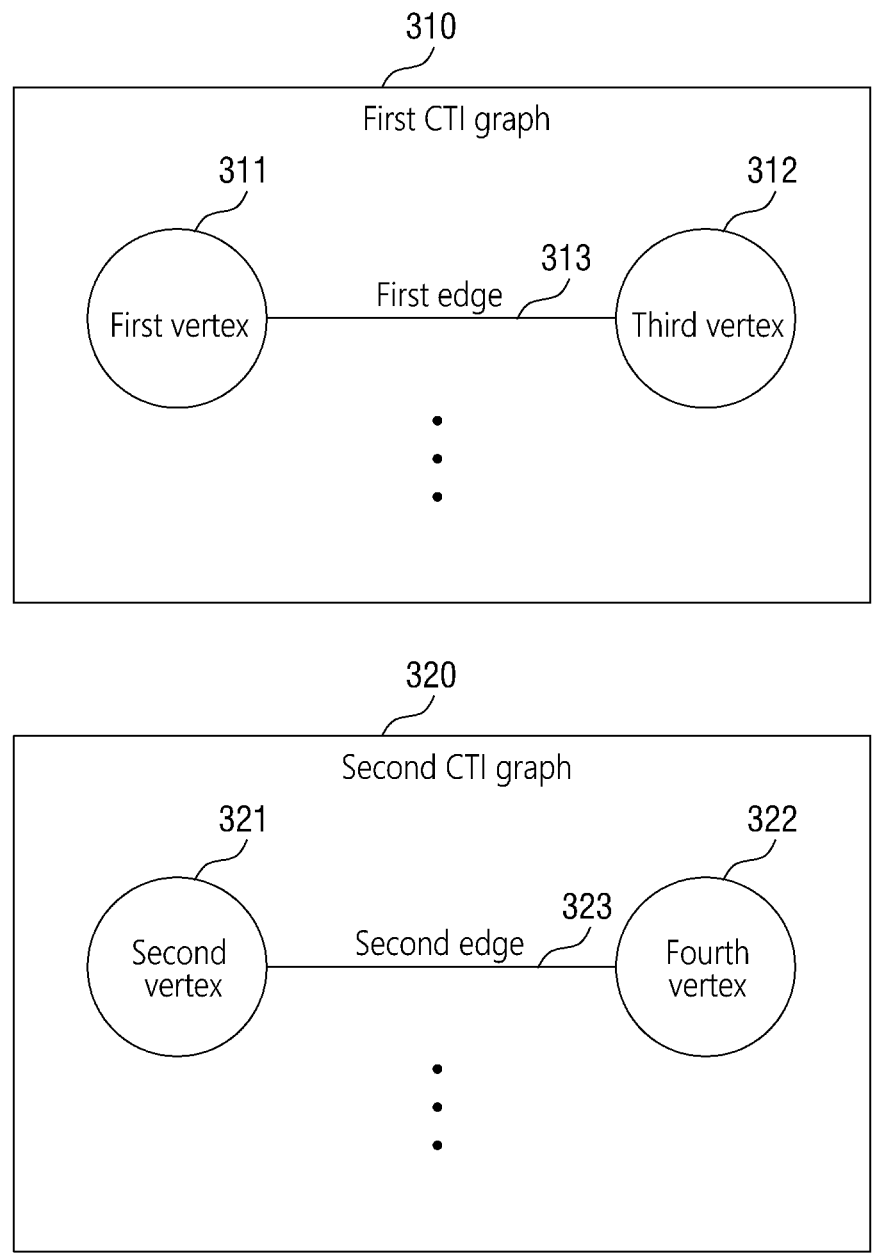
FIG. 3 is a diagram illustrating a concept of a CTI graph including vertices and edges.

FIG. 3 is a diagram illustrating a concept of a CTI graph including vertices and edges.

The database 110 may construct a CTI graph for each channel in which CTI data is collected. Referring to FIG. 3, a first CTI graph 310 may be configured based on the CTI data collected through a first channel, and a second CTI graph 320 may be configured based on the CTI data collected through a second channel.

The CTI graphs 310 and 320 are composed of vertices 311 and 312 and an edge 313 and vertices 312 and 321 and 322 and an edge 323, respectively. The first vertex 311 may be configured such that the first CTI data collected through the first channel is classified according to the first classification items. The third vertex 312 may be configured such that the third CTI data collected through the first channel is classified according to the first classification item. In the first edge 313, the relationship between the first vertex 311 and the third vertex 312 is recorded as its attribute value. Similarly, the second vertex 321 may be configured such that the second CTI data collected through the second channel is classified according to the first classification items. The fourth vertex 322 may be configured such that the fourth CTI data collected through the first channel is classified according to the first classification items. In the second edge 323, the relationship between the second vertex 321 and the fourth vertex 322 is recorded as its attribute value.

The cyber threat intelligence data analyzing apparatus 100 according to an embodiment may determine a graph similarity between the first CTI graph 310 and the second CTI graph 320. According to an embodiment, the cyber threat intelligence data analyzing apparatus 100 may calculate similarity values between the values of the vertices included in the first CTI graph 310 and the values of the vertices included in the second CTI graph 320 in order to determine a graph similarity. The cyber threat intelligence data analyzing apparatus 100 may determine the graph similarity based on the sum of the similarity values.

Figure 4:
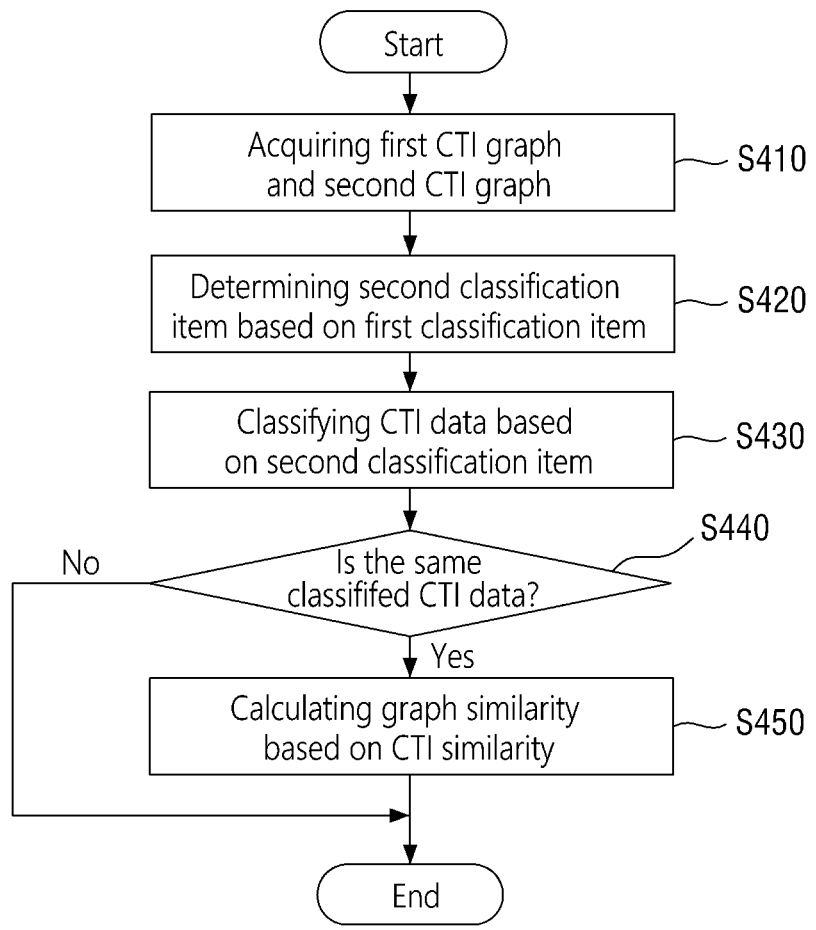
FIG. 4 is a flowchart illustrating a process of analyzing CTI data according to an embodiment.

FIG. 4 is a flowchart illustrating a process of analyzing CTI data according to an embodiment.

First, in S410, the cyber threat intelligence data analyzing apparatus 100 may acquire the first CTI graph and the second CTI graph. According to an embodiment, the first CTI graph and the second CTI graph may be acquired from the database 110. Here, the first CTI data and the second CTI data respectively included in the first CTI graph and the second CTI graph may be classified based on the first classification items. The first CTI data and the second CTI data may be recorded in the first vertex and the second vertex included in the first CTI graph and the second CTI graph, respectively.

Referring to FIG. 5, FIG. 5 shows an example of first CTI data 510 and second CTI data 520 classified based on the first classification items. According to this example, the CTI data values of the first CTI data 510 and the second CTI data 520 are classified into IP, domain, attack type, malware, and vulnerability. However, the first classification items shown in FIG. 5 may be modified depending on embodiments.

Referring to FIG. 4 again, in S420, the cyber threat intelligence data analyzing apparatus 100 may determine the second classification items based on the first classification item into which the CTI data values of the first CTI data 510 and the second CTI data 520 are classified. That is, the cyber threat intelligence data analyzing apparatus 100 may determine items to classify the CTI data depending on which item the CTI data values are classified.

Referring to FIG. 6, FIG. 6 shows second classification items determined depending on the first classification items and a similarity calculation method depending on classification items. According to the embodiment shown in FIG. 6, the CTI data values, which are classified into IP information, attack type information, file name type malware information, and common vulnerability and exposure (CVE) type vulnerability information, may not be additionally classified because one of the second classification items is selected for one of the first classification items.

On the other hand, as for the CTI data values classified into domains, subdomains, domain strings, second level domains (SLDs), and top level domains (TLDs) may be selected as the second classification items. Similarly, as for the CTI data values classified into URL type malware information and URL type vulnerability information, sub-domains, domain strings, second level domains (SLDs), and top level domains (TLDs) may be determined as the second classification items.

Referring to FIG. 4 again, in S430, the cyber threat intelligence data analyzing apparatus 100 may classify the first CTI data and the second CTI data based on the selected second classification items.

For example, as shown in FIG. 7, the CTI data values primarily classified depending on the first classification items may be classified into the CTI data values secondarily classified depending on the second classification items. Referring to the malware item of the first classification items of the first CTI data, it can be ascertained that the CTI data values "hxxp://www.g*****e.co.kr/castlephp/java.exe" are classified into a domainstring, a path, and a file name, which are second classification items for malware items.

Then, in S440, the cyber threat intelligence data analyzing apparatus 100 may determine whether the first CTI data and the second CTI data belong to the same second classification item. When the first CTI data and the second CTI data belong to the same second classification item, the cyber threat intelligence data analyzing apparatus 100 may calculate CTI similarity. That is, the cyber threat intelligence data analyzing apparatus 100 may calculate the CTI similarity only between CTI data belonging to the same second classification item. The similarity for CTI data classified using the second classification items capable of deriving the relevance between arbitrary CTI data instead of calculating the similarity the relevance between arbitrary CTI data may be calculated, thereby increasing the reliability of the calculated CTI similarity. For example, when threat information about file is shared in the form of harsh, even if the similarity between hash values is high, it does not match the similarity of actual information, so that the reliability of similarity may deteriorate. The reason for this is that even if the harsh values are similar to each other, the files thereof may not be the same as or similar to each other.

According to an embodiment, the method of calculating the CTI similarity and the conditions of whether or not to include a CTI similarity calculation target may be changed depending on the second classification items. Referring to FIG. 6, for example, as for the CTI data classified as IP, when the IP address included in the CTI data is included in the information reassigning the IPs assigned to the ISPs, whether the same range is present can be ascertained, and when there is no reassignment information, the same C-class band can be ascertained. Here, the CTI similarity may be calculated close to 0 when the IPs are the same, and may be calculated close to 1 when the IPs are not similar to each other. That is, the similarity may refer to a distance between data (or two vertices). Further, in the case of information about domain, URL type malware, and URL type vulnerability, the cyber threat intelligence data analyzing apparatus 100 may include the information as a similarity calculation target only when the length of a string classified as a subdomain is greater than or equal to the threshold value.

When the data values of the first CTI data and the second CTI data are classified based on the second classification items as shown in FIG. 7, the first CTI data and the second CTI data may be classified depending on the second classification items as shown in FIG. 8. The cyber threat intelligence data analyzing apparatus 100 may perform an operation of calculating the similarity for each second CTI data belonging to the same second classification item as the first CTI data classified depending on the second classification items.

For example, referring to FIG. 9, FIG. 9 shows a list of operations for calculating the CTI similarity to be performed by the cyber threat intelligence data analyzing apparatus 100 with respect to the CTI data classified as a domain string item. When the first CTI data and the second CTI data are classified as shown in FIG. 9, the cyber threat intelligence data analyzing apparatus 100 may calculate the CTI similarity for each of the second CTI data values "sp*ok, sp*hkrp, sp*khre, g*e, and spo*ok" from the first CTI data value "spo*kac". Similarly, the cyber threat intelligence data analyzing apparatus 100 may calculate the CTI similarity for each of the second CTI data values from the CTI values "spo*hkrr and spo***khrf" of the first CTI data.

As described above, when similarity is calculated from the CTI data reclassified as the second classification item, the similarity for the CTI data values (for example, a domain item, a malware item, and a vulnerability item) not belonging to the same classification is determined as the same type information based on the first classification items to enable similarity determination to be performed, and the CTI data is classified as the type suitable for similarity determination, thereby increasing the reliability of similarity determination.

The cyber threat intelligence data analyzing apparatus 100 according to an embodiment may calculate the CTI similarity based on Equation 1 below.

$$S(v_1, v_2) = 1 - \frac{Editdistance(v_1, v_2)}{\max(lengh(v_1), lengh(v_2))} \quad \text{[Equation 1]}$$

Here, v1 denotes a first vertex, and v2 denotes a second vertex. S (v1, v2) denotes similarity between the first vertex and the second vertex, that is, similarity between first CTI data included in the first vertex and second CTI data included in the second vertex. Editdistance (v1, v2) denotes a distance between the first vertex and the second vertex. Max (length (v1), length (v2)) is the maximum value of the length of data in the first vertex and the second vertex, and denotes the maximum value of Editdistance (v1, v2). Therefore, the similarity S(v1,v2) may have a value of 0 to 1.

The cyber threat intelligence data analyzing apparatus 100 may calculate a graph similarity based on the similarity between the first CTI data and the second CTI data when the first CTI data and the second CTI data are data belonging to the same second classification item (S450). Here, the cyber threat intelligence data analyzing apparatus 100 may calculate the graph similarity based on Equation 2 below:

$$K_{msp}(G_1, G_2) = \frac{1}{cM_1M_2} \sum_{e_1 \in E'_1} \sum_{e_2 \in E'_2} k_{walk}(e_1, e_2) \times S(v_1, v_2) \times S(w_1, w_2) \quad \text{[Equation 2]}$$

Here, Kmsp(G1,G2) denotes a similarity between a first graph G1 and a second graph G2. M1 denotes the number of edges included in the first graph G1. M2 denotes the number of edges included in the second graph G2.

Here, when e1 and e2 are each defined as 1, Equation 2 is summarized as Equation 3 below, and the cyber threat intelligence data analyzing apparatus 100 may calculate a graph similarity based on Equation 3 below:

$$K_{msp}(G_1, G_2) = \quad \text{[Equation 3]}$$
$$\frac{1}{cM_1M_2} \sum_{e_1 \in E'_1} \sum_{e_2 \in E'_2} \left(1 - \frac{Editdistance(v_1, v_2)}{\max(\text{length}(v_1), \text{length}(v_2))}\right) \times$$
$$\left(1 - \frac{Editdistance(w_1, w_2)}{\max(\text{length}(w_1), \text{length}(w_2))}\right) \times e$$

Here, according to an embodiment, the edge connecting the first vertex v1 and the third vertex w1 and the edge connecting the second vertex v2 and the fourth vertex w2 may have the same type. When the types are different, the value of CTI similarity may be processed as 0 (zero).

Figure 10:
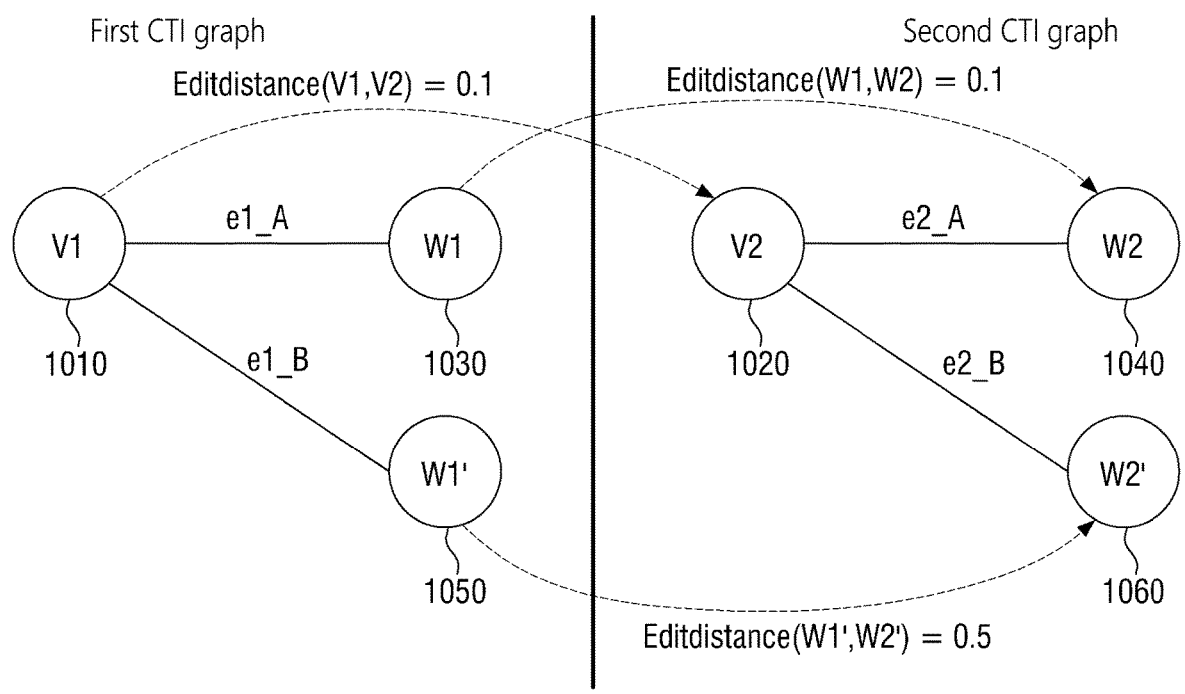
FIG. 10 is a diagram illustrating a concept of a method of calculating a graph similarity according to an embodiment.

FIG. 10 is a diagram illustrating a concept of a method of calculating a graph similarity according to an embodiment. In particular, it is assumed in FIG. 10 that the first vertex 1010 and second vertex 1030 of the first graph are classified into the same second classification type. Similarly, it is assumed in FIG. 10 that the third vertex 1030 and fourth vertex 1040 of the first graph are classified into the same second classification type. Further, it is assumed in FIG. 10 that the fifth vertex 1050 and sixth vertex 1060 of the first graph are classified into the same second classification type.

The cyber threat intelligence data analyzing apparatus 100 may calculate the distance between the first vertex 1010 of the first CTI graph and the second vertex 1020 of the second CTI graph.

Referring to FIG. 10, the similarity between the first vertex 1010 and the second vertex 1020 may be determined using Equation 1 above based on the distance between the first vertex 1010 and the second vertex 1020.

It is shown in FIG. 10 that the distance between the first vertex 1010 and the second vertex 1020 is calculated as 0.1, the distance between the third vertex 1030 and the fourth vertex 1040 is calculated as 0.1, and the distance between the fifth vertex 1050 and the sixth vertex 10620 is calculated as 0.5. Since the number of edges in the first CTI graph is 2, M1 is 2. Further, since the number of edges in the second CTI graph is 2, M2 is 2.

The calculation of the graph similarity Kmsp between the first CTI graph and the second CTI graph shown in FIG. 10 based on Equation 3 is performed as shown in Equation 4 below.

$$Kmsp = \frac{1}{c*2*2}[\{S(v_1v_2)*S(w_1, w_2)*c\} + \quad \text{[Equation 4]}$$
$$\{S(v_1v_2)*S(w_{1'}, w_{2'})\} + 0 + 0] =$$
$$\frac{1}{4c}[\{(1-0.1)*(1-0.1)*c\} + \{(1-0.1)*(1-0.5)*c\}] \Big/$$
$$4c = 0.315$$

In Equation 4, since edge e1_A and edge e2_B have different types from each other and edge e2_B and edge e2_A have different types from each other, the similarity value is processed as 0 without being calculated.

As a result, according to the example shown in FIG. 10, the graph similarity is 0.315.

According to an embodiment, the cyber threat information analysis and sharing system 10 may set the first CTI graph and the second CTI graph to be included in one group when the calculated graph similarity is equal to or greater than the threshold value (for example, 0.5). Further, the cyber threat information analysis and sharing system 10 may reflect the CTI data in the database such that the CTI information including the first CTI graph and the second CTI graph is output for each group according to the set group.

The methods according to the embodiments of the disclosure described so far can be performed by the execution of a computer program embodied in computer-readable code. The computer program may be transmitted from a first electronic device to a second electronic device through a network such as the Internet and may be installed and used in the second electronic device. Examples of the first electronic device and the second electronic device include fixed electronic devices such as a server, a physical server belonging to a server pool for a cloud service, and a desktop PC.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A method of analyzing cyber threat intelligence (CTI) data using a computing device, comprising:
   acquiring a first CTI graph including a first vertex composed of first CTI data classified based on a first classification item, the first classification item including a vulnerability item or a domain item, and a second CTI graph including a second vertex composed of second CTI data classified based on the first classification item;

classifying the first CTI data and the second CTI data based on a second classification item determined depending on the first classification item, the second classification item including a subdomain item, a domainstring item, a top level domain item, and a second level domain;

outputting a graph similarity of the first CTI graph and the second CTI graph determined based on a first CTI similarity between the first CTI data and the second CTI data when the first CTI data and the second CTI data belong to the same classification as a result of the classification;

setting the first CTI graph and the second CTI graph to be included in one group when the graph similarity is equal to or greater than a threshold value; and outputting CTI information including the first CTI data and the second CTI data for each group.

2. The method of claim 1,
wherein the first classification item includes a vulnerability item,
and the second classification item further includes a path item, a filename item, and a common vulnerability enumeration (CVE) item.

3. The method of claim 1,
wherein, in the outputting of the graph similarity, the first CTI similarity is calculated from data classified as the vulnerability item only when a length of information classified as the subdomain item is equal to or greater than a threshold value, and the graph similarity is determined based on the calculated CTI similarity.

4. The method of claim 1,
wherein the first classification item includes a domain item.

5. The method of claim 1,
wherein, in the outputting of the graph similarity, a plurality of similarity values is acquired by performing string comparison between pieces of information classified into the subdomain item and the domainstring item, and the highest value of the plurality of similarity values is determined as the CTI similarity.

6. The method of claim 1,
wherein the first CTI graph includes a third vertex composed of a third CTI data connected with the first vertex through a first edge, and the second CTI graph includes a fourth vertex composed of a fourth CTI data connected with the second vertex through a second edge, and wherein the outputting of the similarity includes:
determining the graph similarity based on a product of the first CTI similarity and the second CTI similarity,
wherein the first CTI similarity is determined based on a distance between the first vertex and the second vertex, and the second CTI similarity is determined based on a distance between the third vertex and the fourth vertex.

7. The method of claim 6,
wherein, in the determining of the graph similarity, the product of the first CTI similarity and the second CTI similarity is reflected in the graph similarity only when the first edge and the second edge have the same type.

8. The method of claim 6,
wherein, in the determining of the graph similarity, the graph similarity is determined based Equation below:

$$K_{msp}(G_1, G_2) = \frac{1}{cM_1M_2} \sum_{e_1 \in E'_1} \sum_{e_2 \in E'_2} k_{walk}(e_1, e_2) \times S(v_1, v_2) \times S(w_1, w_2)$$

wherein G1 is a first CTI graph, G2 is a second CTI graph, M1 is the number of edges included in the first CTI graph, M2 is the number of edges included in the second CTI graph, v1 is a first vertex, v2 is a second vertex, w1 is a third vertex, w2 is a fourth vertex, e1 is a first edge, e2 is a second edge, c is a constant, and S(v1,v2) is the first CTI similarity calculated from the first vertex and the second vertex.

9. The method of claim 1,
wherein the first classification item includes a file item, and
the second classification item includes a filename item and a hash item.

10. The method of claim 9,
wherein, in the outputting of the graph similarity, information classified as the hash item is excluded from a similarity calculation target.

11. A cyber threat intelligence data analyzing apparatus, comprising:
a processor; and
a memory storing one or more instructions executed by the processor,
wherein the one or more instructions includes:
acquiring a first CTI graph including a first vertex composed of first CTI data classified based on a first classification item, the first classification item including a vulnerability item or a domain item, and a second CTI graph including a second vertex composed of second CTI data classified based on the first classification item;

classifying the first CTI data and the second CTI data based on a second classification item determined depending on the first classification item, the second classification item including a subdomain item, a domainstring item, a top level domain item, and a second level domain;

outputting a graph similarity of the first CTI graph and the second CTI graph determined based on a first CTI similarity between the first CTI data and the second CTI data when the first CTI data and the second CTI data belong to the same classification as a result of the classification;

setting the first CTI graph and the second CTI graph to be included in one group when the graph similarity is equal to or greater than a threshold value; and outputting CTI information including the first CTI data and the second CTI data for each group.

12. A computer program stored in a non-transitory computer-readable storage medium, wherein instructions of the computer program, when executed by a processor of a cyber threat intelligence data analyzing apparatus, cause the system to perform:

acquiring a first CTI graph including a first vertex composed of first CTI data classified based on a first classification item, the first classification item including a vulnerability item or a domain item, and a second CTI graph including a second vertex composed of second CTI data classified based on the first classification item;

classifying the first CTI data and the second CTI data based on a second classification item the second classification item including a subdomain item, a domainstring item, a top level domain item, and a second level domain, determined depending on the first classification item;

outputting a graph similarity of the first CTI graph and the second CTI graph determined based on a first CTI similarity between the first CTI data and the second CTI data when the first CTI data and the second CTI data belong to the same classification as a result of the classification;

setting the first CTI graph and the second CTI graph to be included in one group when the graph similarity is equal to or greater than a threshold value; and outputting CTI information including the first CTI data and the second CTI data for each group.

13. A cyber threat intelligence analysis system, comprising:

a threat information storage/management platform recording first CTI data collected through a first channel in a first vertex of a first CTI graph and recording second data through a second channel in a second vertex of a second CTI graph;

a database storing the first CTI graph and the second CTI graph;

a threat information classification module classifying the first CTI data and the second CTI data based on a first classification item, including a vulnerability item or a domain item; and a cyber threat intelligence data analyzing apparatus classifying the first CTI data and the second CTI data based on a second classification item, the second classification item including a subdomain item, a domainstring item, a top level domain item, and a second level domain, determined depending on the first classification item, outputting a graph similarity of the first CTI graph and the second CTI graph determined based on a first CTI similarity between the first CTI data and the second CTI data when the first CTI data and the second CTI data belong to the same classification as a result of the classification, setting the first CTI graph and the second CTI graph to be included in one group when the graph similarity is equal to or greater than a threshold value, and outputting CTI information including the first CTI data and the second CTI data for each group.

* * * * *